United States Patent
Ikäheimo et al.

(10) Patent No.: US 9,755,465 B2
(45) Date of Patent: Sep. 5, 2017

(54) METHOD FOR MANUFACTURING A ROTOR OF A SYNCHRONOUS RELUCTANCE MOTOR, A ROTOR OF A SYNCHRONOUS RELUCTANCE MOTOR, AND A SYNCHRONOUS RELUCTANCE MOTOR

(71) Applicant: ABB Technology AG, Zürich (CH)

(72) Inventors: Jouni Ikäheimo, Vaasa (FI); Jere Kolehmainen, Vaasa (FI)

(73) Assignee: ABB Schweiz AG, Baden (CH)

(*) Notice: Subject to any disclaimer, the term of this patent is extended or adjusted under 35 U.S.C. 154(b) by 524 days.

(21) Appl. No.: 14/504,922

(22) Filed: Oct. 2, 2014

(65) Prior Publication Data
US 2015/0022033 A1 Jan. 22, 2015

Related U.S. Application Data

(63) Continuation of application No. PCT/EP2013/057593, filed on Apr. 11, 2013.

(30) Foreign Application Priority Data

Apr. 12, 2012 (EP) .................................. 12163924

(51) Int. Cl.
H02K 1/24 (2006.01)
H02K 15/02 (2006.01)
H02K 1/02 (2006.01)

(52) U.S. Cl.
CPC ............... H02K 1/246 (2013.01); H02K 1/02 (2013.01); H02K 15/022 (2013.01); Y10T 29/49012 (2015.01)

(58) Field of Classification Search
CPC H02K 1/24; H02K 1/02; H02K 15/02; H02K 1/246; H02K 15/022; Y10T 29/49012

(Continued)

(56) References Cited

U.S. PATENT DOCUMENTS 2,784,333 A    3/1957  Gunselman
5,296,773 A *  3/1994  El-Antably ............ H02K 1/246
                                                    310/106

(Continued)

FOREIGN PATENT DOCUMENTS

DE            150673          9/1981
DE     102007007159 A1        8/2008

(Continued)

OTHER PUBLICATIONS

Ip.com search.*

(Continued)

*Primary Examiner* — Naishadh Desai
(74) *Attorney, Agent, or Firm* — Taft Stettinius & Hollister LLP

(57) ABSTRACT

The present disclosure relates to rotating electric machines which may be used for industrial applications, to a method for manufacturing a rotor of a synchronous reluctance motor, a rotor of a synchronous reluctance motor, and a synchronous reluctance motor. A rotor of a synchronous reluctance motor according to the present disclosure has a cylindrical rotor body part casted from a superparamagnetic material, and ferromagnetic flux guides arranged inside the casted cylindrical rotor body part. The flux guides are arranged to go through from one side of the outer circumference of the cylindrical rotor part to the other side of the outer circumference of the cylindrical rotor part in the direction of the direct axis of the synchronous reluctance motor.

20 Claims, 6 Drawing Sheets

(58) Field of Classification Search
USPC .................................. 310/156.01, 43, 44, 46
See application file for complete search history.

(56) References Cited

U.S. PATENT DOCUMENTS

| | | | |
|---|---|---|---|
| 6,066,904 A | | 5/2000 | Fei et al. |
| 6,239,526 B1 | | 5/2001 | Oh et al. |
| 2003/0020351 A1 | | 1/2003 | Lee et al. |
| 2003/0062791 A1 | | 4/2003 | Reiter, Jr. et al. |
| 2003/0063993 A1 | | 4/2003 | Reiter, Jr. et al. |
| 2004/0189123 A1* | | 9/2004 | Nusser ................ F16C 32/0406 310/90.5 |
| 2006/0170301 A1 | | 8/2006 | Masuzawa et al. |
| 2007/0170803 A1 | | 7/2007 | Yabe et al. |
| 2008/0197718 A1* | | 8/2008 | Wohner ................... H02K 1/02 310/11 |
| 2012/0086289 A1* | | 4/2012 | Kolehmainen ........ H02K 1/246 310/46 |
| 2013/0228929 A1* | | 9/2013 | Meinhold ........... H01L 21/7685 257/762 |
| 2014/0346389 A1* | | 11/2014 | Rowe .................... H01F 1/0054 252/62.59 |

FOREIGN PATENT DOCUMENTS

| | | |
|---|---|---|
| DE | 102008027759 A1 | 12/2009 |
| EP | 0541529 B1 | 7/1996 |
| EP | 1300207 A2 | 4/2003 |
| EP | 2442432 A2 | 4/2012 |
| GB | 1109974 A | 4/1968 |
| JP | 09-285087 A | 10/1997 |
| JP | 11-144930 A | 5/1999 |
| JP | 2000-014107 A | 1/2000 |
| JP | 2005-24052 A | 9/2005 |
| KR | 10-0709301 B1 | 4/2007 |
| WO | WO 96/42132 A1 | 12/1996 |

OTHER PUBLICATIONS

Opposition filed on Sep. 17, 2015, by Lorenz Seidler Gossel in corresponding European Patent No. 2 651 010 B1. (24 pages).
Hofmann et al., "High-Speed Synchronous Reluctance Machine with Minimized Rotor Losses", Industry Applications, IEEE Transactions, Apr. 2000, vol. 36, No. 2, pp. 531-539.
Office Action dated Sep. 8, 2015, issued by the Japanese Patent Office in corresponding Japanese Patent Application No. 2015-504956, and an English translation of the Office Action. (7 pages).
International Search Report (PCT/ISA/210) mailed on Jul. 31, 2013, by the European Patent Office as the International Searching Authority for International Application No. PCT/EP2013/057593.
Written Opinion (PCT/ISA/237) mailed on Jul. 31, 2013, by the European Patent Office as the International Searching Authority for International Application No. PCT/EP2013/057593.

* cited by examiner

METHOD FOR MANUFACTURING A ROTOR OF A SYNCHRONOUS RELUCTANCE MOTOR, A ROTOR OF A SYNCHRONOUS RELUCTANCE MOTOR, AND A SYNCHRONOUS RELUCTANCE MOTOR

RELATED APPLICATIONS

This application claims priority as a continuation application under 35 U.S.C. §120 to PCT/EP2013/057593, which was filed as an International Application on Apr. 11, 2013 designating the U.S., and which claims priority to European Application 12163924.9 filed in Europe on Apr. 12, 2012. The entire contents of these applications are hereby incorporated by reference in their entireties.

FIELD

The present disclosure relates to the field of rotating electric machines which may be used for industrial applications, such as for motors and generators used within the transportation industry, energy industry, process industry and manufacturing industry. More particularly, the present disclosure relates to a method for manufacturing a rotor of a synchronous reluctance motor, a rotor of a synchronous reluctance motor, and a synchronous reluctance motor.

BACKGROUND

Rotating electrical machines can be used in industry for different applications, such as electric motors and generators within the transportation industry, within the process and manufacturing industry, and within the energy industry. Electrical machine is the generic name for a device that converts mechanical energy to electrical energy, converts electrical energy to mechanical energy, or changes alternating current from one voltage level to a different voltage level. Electrical machines as employed in industry fall into three categories according to how they convert energy. Generators convert mechanical energy to electrical energy. Motors convert electrical energy to mechanical energy. Transformers change the voltage of alternating current. Motors and generators commonly belong to the subset of rotating electrical machines.

An electric motor converts electrical energy into mechanical energy. Most electric motors operate through the interaction of magnetic fields and current-carrying conductors to generate force. Electric motors can be found in applications as diverse as industrial applications, small and medium size industrial motors of highly standardized dimensions and characteristics provide convenient mechanical power for industrial uses. Larger electric motors can be used for propulsion of ships in ship propulsion unit applications of the marine industry, for pipeline compressors, and for water pumps with ratings in the millions of watts.

The two main parts of a rotating electrical machine can be described in mechanical terms. A rotor is the rotating part of an electrical machine, and a stator is the stationary part of an electrical machine. The rotor rotates because the wires and magnetic field of the motor can be arranged so that a torque is developed about the rotor's axis. A rotor shaft is a mechanical component for transmitting torque and rotation.

A reluctance motor is a type of electric motor that induces non-permanent magnetic poles on a ferromagnetic rotor which is simply constructed from magnetic material such as soft iron. Torque is generated through the phenomenon of magnetic reluctance.

Synchronous reluctance motors have an equal number of stator and rotor poles. The projections on the rotor can be arranged to introduce internal flux barriers, i.e. holes which direct the magnetic flux along the so-called direct axis. Generally, the axis in the direction of permanent magnet flux is referenced as a direct axis or d-axis, and the axis which is 90 degrees ahead of the direct axis is referenced as a quadrature axis or q-axis. Pole numbers are known to be 4 and 6. When the spaces or notches between the rotor poles can be opposite the stator poles, the magnetic circuit of the motor has a high magnetic reluctance, but when the rotor poles can be aligned with the stator poles the magnetic circuit has a low magnetic reluctance. When a stator pole pair is energized, the nearest rotor pole pair will be pulled into alignment with the energized stator poles to minimize the reluctance path through the machine. As with brushless permanent magnet motors, rotary motion is made possible by energizing the stator poles sequentially causing the rotor to step to the next energized pole.

The synchronous reluctance motor is designed to run on mains frequency alternating current and it uses distributed stator windings similar to those used in squirrel cage induction motors. The rotor, however, needs salient poles to create a variable reluctance in the motor's magnetic circuit which depends on the angular position of the rotor. These salient poles can be created by milling axial slots along the length of a squirrel cage rotor.

The synchronous reluctance motor is not self-starting without the squirrel cage. During run up, it behaves as an induction motor but as it approaches synchronous speed, the reluctance torque takes over and the motor locks into synchronous speed. Once started at synchronous speed, the synchronous reluctance motors motor can operate with sinusoidal voltage. As the rotor is operating at synchronous speed and there are no current-conducting parts in the rotor, rotor losses can be minimal compared to those of an induction motor. Speed control of the synchronous reluctance motors may require an electronic frequency converter.

A stator of a synchronous reluctance motor may have a polyphase stator winding, which has been integrated to grooves in stator core made of magnetically conductive plates. The stator winding produces a rotating field which rotates at the frequency determined by the supply network or by the frequency converter connected to the synchronous reluctance motor. The stator winding of a synchronous reluctance motor is similar to the stator winding of a synchronous motor or to the stator winding of an induction motor. A rotor of a synchronous reluctance motor has been mounted on bearings to rotate within an air gap clearance from the stator.

The functioning of a synchronous reluctance motor is based on an anisotropic rotor structure which rotor has different inductances along its direct and quadrature axes; the inductance along of the direct axis being referenced as $L_d$ and the inductance along of the quadrature axis being referenced as $L_q$. In its simplest salient pole form, it is similar to the classical synchronous machine without a field winding. However, unlike the synchronous machine, it can only operate at lagging power factor, because all the excitation is from the stator. The linear-start reluctance motors start as induction motors and hence, provided with squirrel cage bars, on the rotor. The stator is similar to the stator of induction counterpart. The motor is accelerated under the influence of induction motor torque and near synchronous speeds, pulled-into synchronism with the synchronously rotating stator field.

The rotor of a synchronous reluctance motor will always try to align its poles with the position that provides minimum reluctance (corresponding to the minimum stored energy in the system). In other words, the torque in a reluctance motor is developed by virtue of a change in the reluctance with the rotor position. The rotor of a synchronous reluctance motor is constructed so that the magnetic permeability is large in the direction of the direct axis and small in the direction of the quadrature axis.

The principle of operation of reluctance machines is based on existence of variable reluctance in the air gap of the machine, high reluctance in the quadrature axis (q-axis) and low reluctance in the direct axis (d-axis). Therefore, for maximizing the power or the torque of a synchronous reluctance motor, the inductance ratio $L_d/L_q$ has to be as great as possible. Therefore, in order to achieve a great inductance ratio $L_d/L_q$, a number of different structures have been proposed where conducting routes have been designed for magnetic flux along the d-axis and magnetic reluctance barriers have been designed for magnetic flux along the q-axis.

In some structures, the conductive routes for the magnetic flux have been formed with ferromagnetic plates designed so that the ferromagnetic plates have a great magnetic permeability in the direction along the d-axis. Magnetic reluctance barriers have been created by using air or some non-ferromagnetic material.

In JP 2005245052 and U.S. Pat. No. 6,239,526, a rotor of a synchronous reluctance motor have been presented in which the reluctance barriers for the magnetic flux have been formed to the rotor by cutting or carving off parts of the rotor core plates.

In GB 1,109,974, a rotor structure has been presented in which thin electric plates have been constructed on the rotor axle, the plates having a specific preferred magnetic direction having the maximum permeability.

In KR 709301 and U.S. Pat. No. 6,066,904. a rotor of a two-pole synchronous reluctance motor have been presented which rotor has been constructed from directed thin electric plates. In order to achieve the necessary anisotropy of reluctance, slots i.e. magnetic reluctance barriers can be provided in the lamination along the magnetic flux lines in the preferred direction In JP 11144930, a rotor of a synchronous reluctance motor has been presented in which the rotor core structure is formed by stacking stripe-shaped metal pieces and metallurgically joining a magnetic metal material and a non-magnetic metal material.

In WO 96/42132, a rotor of a synchronous reluctance motor has been presented in which the rotor core structure is constructed from magnetic material and non-magnetic material, and which materials can be covered with a layer of non-magnetic conducting material.

There can be some problems when using rotor core structures constructed from magnetic material and non-magnetic material, which materials can be laminated with a layer of non-magnetic conducting material. These laminated rotor core structures cannot withstand high centrifugal forces.

So far, the high speed motor rotors have utilized induction technologies (coated solid rotors) or synchronous permanent magnet technologies. In order to cope with the ultra-high centrifugal forces, the conductive copper coating should be explosion welded to the solid iron surface. In permanent magnet rotors, the magnets have to be secured using thick carbon fiber bandage, which is adverse in thermal sense. Both of these technologies can be difficult and expensive to manufacture. The permanent magnet rotor also suffers from vulnerability to eddy current losses in magnets.

The problem therefore is to find a configuration and materials which can produce the reluctance effect and withstand the centrifugal forces while still keeping the harmonic losses on the rotor surface to minimum.

There is a demand for a method for manufacturing a rotor of a synchronous reluctance motor which rotor would produce the reluctance effect, withstand the centrifugal forces and keep the harmonic losses on the rotor surface to minimum when compared to the prior art solutions. Likewise, there is a demand for a rotor of a synchronous reluctance motor producing the reluctance effect, withstanding the centrifugal forces and keeping the harmonic losses on the rotor surface to minimum when compared to the prior art solutions; and also a demand for a synchronous reluctance motor with a rotor having such characteristics.

SUMMARY

An exemplary embodiment of the present disclosure provides a method for manufacturing a rotor of a synchronous reluctance motor with ferromagnetic flux guides. The exemplary method includes manufacturing a cylindrical rotor body part by casting from a superparamagnetic material.

An exemplary embodiment of the present disclosure provides a rotor of a synchronous reluctance motor. The exemplary rotor includes a cylindrical rotor body part casted from a superparamagnetic material. In addition, the exemplary rotor includes ferromagnetic flux guides arranged inside the casted cylindrical rotor body part, and going through from one side of the outer circumference of the cylindrical rotor part to the other side of the outer circumference of the cylindrical rotor part in the direction of a direct axis of the synchronous reluctance motor.

BRIEF DESCRIPTION OF THE DRAWINGS

Additional refinements, advantages and features of the present disclosure are described in more detail below with reference to exemplary embodiments illustrated in the drawings, in which.

DETAILED DESCRIPTION

Figure 1:
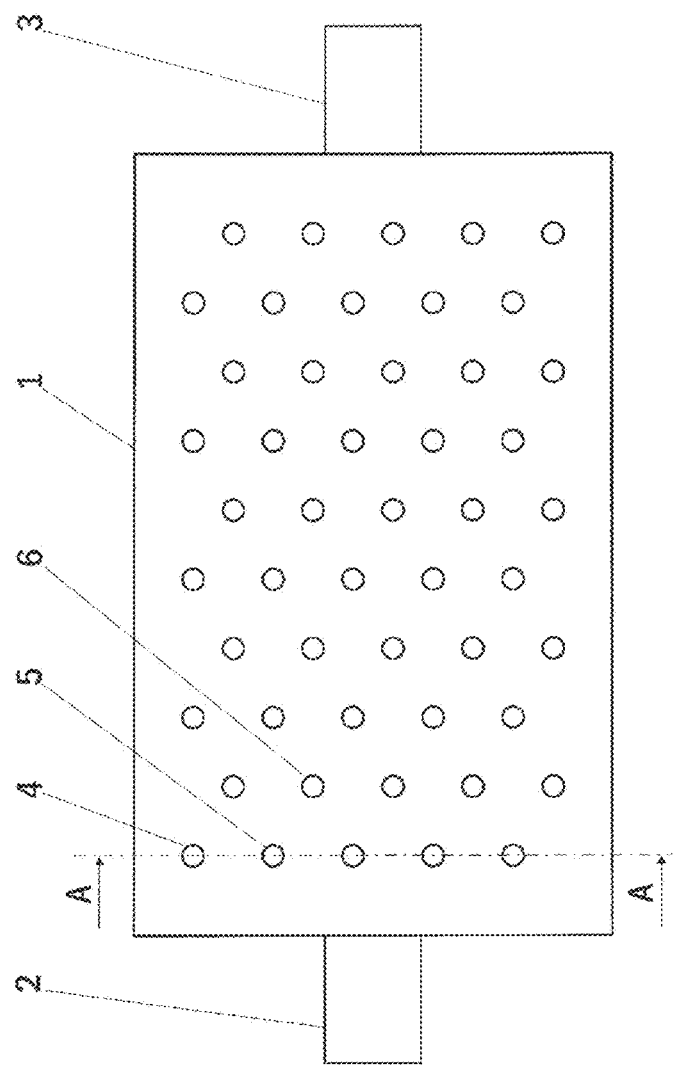
FIG. 1 shows a side view of a rotor of a synchronous reluctance motor according to an exemplary embodiment of the present disclosure.

Exemplary embodiments of the present disclosure provide a method and an apparatus for implementing the method which overcome the above problems associated with known techniques and alleviate the above disadvantages.

An exemplary embodiment of the present disclosure provides a method for manufacturing a rotor of a synchronous reluctance motor with ferromagnetic flux guides. The exemplary method includes the step of manufacturing a cylindrical rotor body part by casting from a superparamagnetic material.

According to an exemplary embodiment, the method includes the steps of supporting ferromagnetic flux guides with special support structures connected to a cast mould of a cylindrical rotor body part and manufacturing the cylindrical rotor body part by casting from a superparamagnetic material, so that the ferromagnetic flux guides go through from one side of the outer circumference of the cylindrical rotor part to the other side of the outer circumference of the cylindrical rotor part in the direction of the direct axis of the synchronous reluctance motor.

According to an exemplary embodiment, after casting, rotor shaft parts can be fixed to both ends of the rotor body part. Alternatively, before casting, an inner cylindrical rotor shaft part is placed into the cast mould of the rotor body part.

According to an exemplary embodiment, the method includes the steps of manufacturing a cylindrical rotor body part by casting from a superparamagnetic material, drilling holes to the cylindrical rotor body part so that the holes go through from one side of the outer circumference of the cylindrical rotor part to the other side of the outer circumference of the cylindrical rotor part in the direction of the direct axis of the synchronous reluctance motor, and inserting supporting ferromagnetic flux guides to the holes.

According to an exemplary embodiment, after casting, rotor shaft parts can be fixed to both ends of the rotor body part. Alternatively, before casting, an inner cylindrical rotor shaft part is placed into the cast mould of the rotor body part.

According to an exemplary embodiment, the method includes the steps of assembling magnetically conducting parts of the rotor by manufacturing uniform ferromagnetic pieces from ferromagnetic plate and stacking the ferromagnetic pieces up to form, the uniform ferromagnetic pieces including a narrow outer circumferential part and ferromagnetic flux guides essentially in the direction of the direct axis of the reluctance motor, manufacturing the cylindrical rotor body part by casting from a superparamagnetic material, so that the ferromagnetic flux guides go through from one side of the outer circumference of the cylindrical rotor part to the other side of the outer circumference of the cylindrical rotor part and removing the narrow outer circumferential part of the ferromagnetic piece is removed at the entire length of the rotor allowing the ferromagnetic flux guides to reach the outer circumference of the cylindrical part of the rotor structure.

According to an exemplary embodiment, before casting, an inner cylindrical rotor shaft part is placed into the cast mould of the rotor body part, the rotor shaft part is supported by narrow inner circumferential parts of the ferromagnetic pieces, which narrow inner circumferential parts can be connected to the narrow outer circumferential part of the ferromagnetic pieces with narrow strips.

Exemplary embodiments of the present disclosure provide a rotor of a synchronous reluctance motor. The exemplary rotor includes a cylindrical rotor body part casted from a superparamagnetic material, and ferromagnetic flux guides arranged inside the casted cylindrical rotor body part, and going through from one side of the outer circumference of the cylindrical rotor part to the other side of the outer circumference of the cylindrical rotor part in the direction of the direct axis of the synchronous reluctance motor.

According to an exemplary embodiment, the ferromagnetic flux guides can be straight. Alternatively, the ferromagnetic flux guides can be curved. According to an exemplary embodiment, the ferromagnetic flux guides can be placed within a distance of 0.5-1.5 times the ferromagnetic flux guide diameter apart from one another in the direction of the rotor shaft and in the direction of the rotor radius.

According to an exemplary embodiment, the cross-section of the ferromagnetic flux guides is one of the following: round, hexagon, rectangle, parallelogram and ellipse. According to an exemplary embodiment, the ferromagnetic flux guides can be manufactured from one of the following material: steel, iron, electric plate, steel wire and braided wire.

According to an exemplary embodiment, the ferromagnetic flux guides end at the outer circumference of the cylindrical rotor part. Alternatively, the ferromagnetic flux guides protrude beyond the outer circumference of the cylindrical rotor part.

According to an exemplary embodiment, rotor shaft parts can be fixed to both ends of the cylindrical rotor body part. Alternatively, the cylindrical rotor body part is casted around an inner cylindrical rotor shaft part.

Exemplary embodiments of the present disclosure provide a synchronous reluctance motor having a rotor, where the rotor includes a cylindrical rotor body part casted from a superparamagnetic material, and ferromagnetic flux guides arranged inside the casted cylindrical rotor body part, and going through from one side of the outer circumference of the cylindrical rotor part to the other side of the outer circumference of the cylindrical rotor part in the direction of the direct axis of the synchronous reluctance motor.

FIG. 1 shows a side view of a rotor of a synchronous reluctance motor according to an exemplary embodiment of the present disclosure. The rotor structure according to the illustrated embodiment includes a cylindrical rotor body part 1, which has been cast from a superparamagnetic material. An example of a superparamagnetic material is bearing bronze ($CuAl_{10}Fe_5Ni_5$) which is readily available. In both ends of the rotor body part 1, there are projecting parts 2, 3 functioning as the rotor shaft 2, 3, which can be in this embodiment integral to the rotor body part 1 and cast from the same superparamagnetic material. The rotor shaft parts 2, 3 can also be fixed to both ends of the rotor body part 1. The rotor shaft 2, 3 is bearing-mounted to the frame of the synchronous reluctance motor so that the rotor is centrally supported inside the stator of the synchronous reluctance motor and within an air gap distance from the stator. The cylindrical rotor body part 1 of a rotor of a synchronous reluctance motor according to an exemplary embodiment of the present disclosure includes ferromagnetic flux guides 4, 5, 6, which can be made from ferromagnetic material and have been manufactured as inserts inside the cast. The cross-section of the ferromagnetic flux guides 4, 5, 6 can be one of the following: round, hexagon, rectangle, parallelogram and ellipse. The ferromagnetic flux guides 4, 5, 6 can be made of one of the following material: steel, iron, electric plate, steel wire and braided wire.

Figure 2:
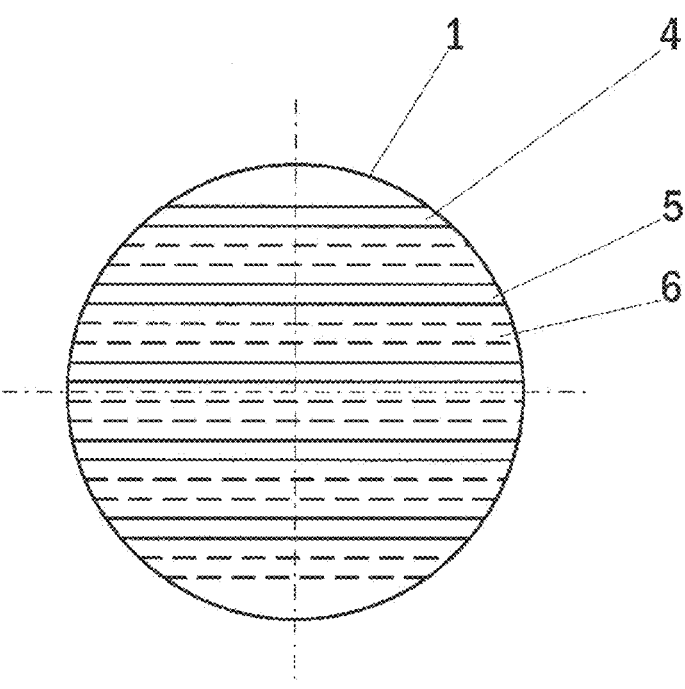
FIG. 2 shows a cross-sectional view of a rotor of a synchronous reluctance motor according to an exemplary embodiment of the present disclosure.

FIG. 2 shows a cross-sectional view of a rotor of a synchronous reluctance motor according to an exemplary embodiment of the present disclosure. The cross-section A-A is marked in FIG. 1. The rotor structure according to the illustrated embodiment of the present disclosure includes a cylindrical rotor body part 1 and ferromagnetic flux guides 4, 5, 6. In this embodiment, the ferromagnetic flux guides 4, 5, 6 go through from one side of the outer circumference of the cylindrical rotor part 1 to the other side of the outer circumference of the cylindrical rotor part 1 in the direction of the direct axis (d-axis) of the reluctance motor, the reluctance motor therefore having a low reluctance in the d-axis. The reluctance is high in the direction of the quadrature axis (q-axis) of the reluctance motor which can be seen in FIG. 2.

The ferromagnetic flux guides 4, 5, 6 can be placed within a distance of 0.5 d-1.5 d apart from one another in the direction of the rotor shaft and in the direction of the rotor radius, d being the diameter of the ferromagnetic flux guide 4, 5, 6. In the exemplary embodiments of FIG. 1 and FIG. 2, there are five rows of ferromagnetic flux guides 4, 5 in the direction of the rotor shaft and another five rows of ferromagnetic flux guides 6 also in the direction of the rotor shaft, which rows of ferromagnetic flux guides 6 have been moved in the direction perpendicular to the rotor shaft and perpendicular to the flux guides 4, 5, 6. This forms a grid structure having five ferromagnetic flux guides 4, 5, 6 in each row, fifty ferromagnetic flux guides 4, 5, 6 in total, all in the direction of the d-axis of the reluctance motor. The ferromagnetic flux guides 6 are marked in FIG. 2 with a dashed line. The diameters of the ferromagnetic flux guides 4, 5, 6 and their distances from one another are here presented as reference examples showing the structural outline. The actual diameters and distances of the ferromagnetic flux guides 4, 5, 6 is determined by the actual materials and parameters of each synchronous reluctance motor.

Figure 3:
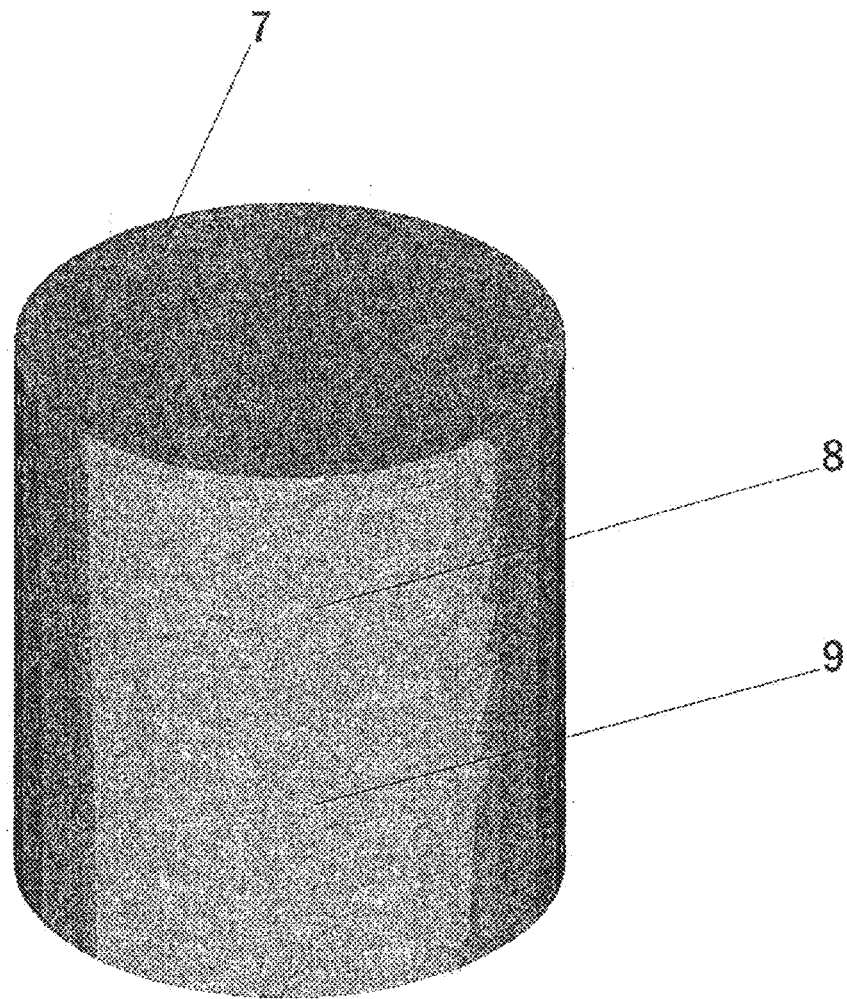
FIG. 3 shows a perspective view of a rotor of a synchronous reluctance motor according to an exemplary embodiment of the present disclosure.

FIG. 3 shows a perspective view of a rotor of a synchronous reluctance motor according to the present disclosure. The rotor structure according to the present disclosure includes a cylindrical rotor body part 7 and ferromagnetic flux guides 8, 9. In FIGS. 1-3 the ferromagnetic flux guides 4-6, 8, 9 can be straight and round. In manufacturing the ferromagnetic flux guides 4-6, 8, 9 can be supported with special support structures connected to the cast mould of the rotor body part 1, 7. The rotor body part 1, 7 is casted from a superparamagnetic material. After casting of the rotor body part 1, 7 the special support structures can be removed. Alternatively the rotor body part 1, 7 can be casted first, after which holes can be drilled to the rotor body part 1, 7 for the ferromagnetic flux guides 4-6, 8, 9. The ferromagnetic flux guides 4-6, 8, 9 can be inserted and glued to the rotor body part 1, 7. Alternatively, the holes of the rotor body part 1, 7 can be threaded and threaded ferromagnetic flux guides 4-6, 8, 9 can be screwed to the rotor body part 1, 7.

Figure 4:
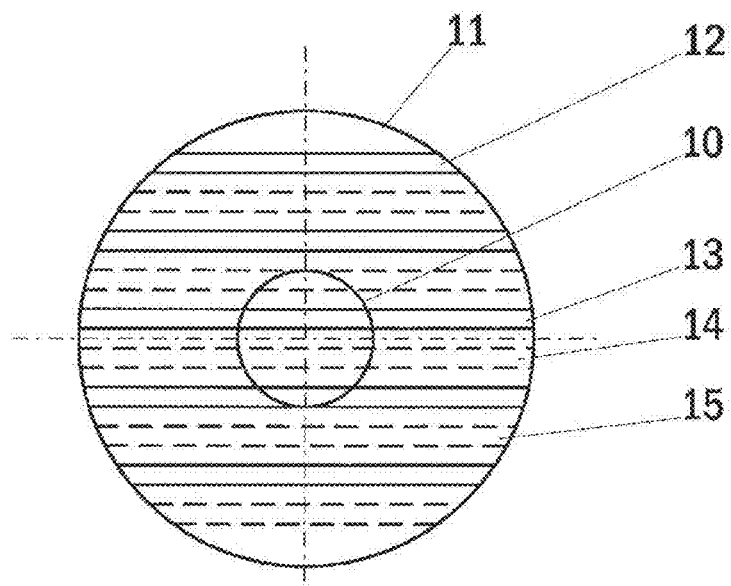
FIG. 4 shows a cross-sectional view of a rotor of a synchronous reluctance motor according to an exemplary embodiment of the present disclosure.

FIG. 4 shows a cross-sectional view of a rotor of a synchronous reluctance motor according to an exemplary embodiment of the present disclosure. In another embodiment of a rotor of a synchronous reluctance motor according to the present disclosure, the rotor core is formed from two different materials. In this embodiment, the rotor includes an inner cylindrical part 10 and an outer cylindrical part 11 formed around the inner cylindrical part 10. The inner cylindrical rotor part 10 can function as a rotor shaft. The inner cylindrical rotor part 10 can also be placed into the cast mould of the rotor body part 11. Thereafter, the rotor body part 11 is casted from a superparamagnetic material. As the rotor is mounted to the synchronous reluctance motor frame where the rotor is centrally supported inside the stator of the synchronous reluctance motor the outer cylindrical rotor part 11 will align within an air gap distance from the stator.

The inner cylindrical rotor part 10 can be made of magnetic metal material, e.g. ferromagnetic material, or alternatively made of non-magnetic metal material, e.g. superparamagnetic material. In the same way as in the embodiments of FIG. 1 and FIG. 2, this embodiment also includes ferromagnetic flux guides 12-15 which go through the cylindrical rotor body parts 10, 11. As seen in FIG. 4, in both sides the ferromagnetic flux guides 12, 15 only go through the inner cylindrical rotor part 10 as in the centre the ferromagnetic flux guides 13, 14 go through both the inner cylindrical rotor part 10 and through the outer cylindrical rotor part 11. In the embodiment of FIG. 4 the ferromagnetic flux guides 12-15 ends at the outer circumference of the outer cylindrical rotor part 11.

Figure 5:
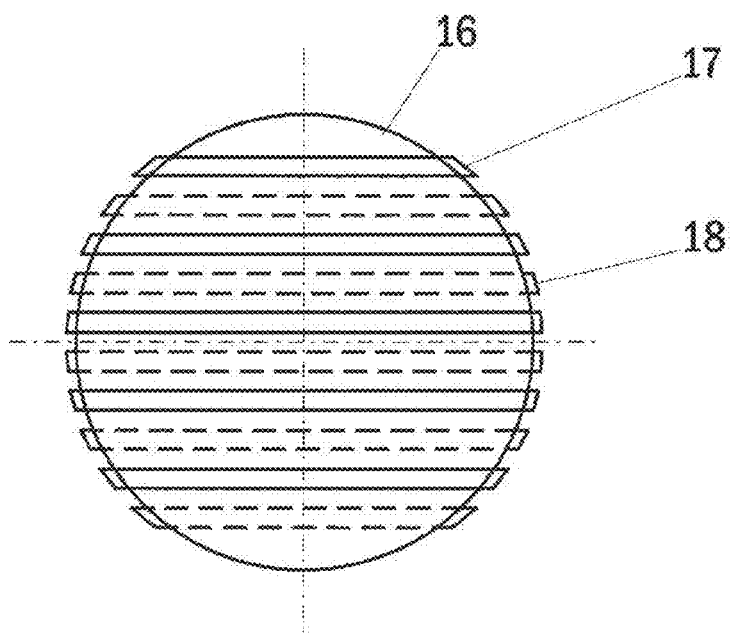
FIG. 5 shows a cross-sectional view of a rotor of a synchronous reluctance motor according to an exemplary embodiment of the present disclosure.

FIG. 5 shows a cross-sectional view of a rotor of a synchronous reluctance motor according to an exemplary embodiment of the present disclosure. In the illustrated embodiment of a rotor of a synchronous reluctance motor according to the present disclosure, the rotor includes a cylindrical rotor body part 16, which has been cast from a superparamagnetic material. The cylindrical rotor body part 16 according to this embodiment includes ferromagnetic flux guides 17, 18 essentially in the direction of the direct axis (d-axis) of the reluctance motor, which can be made from ferromagnetic material and have been manufactured as inserts inside the cast. In the embodiment of FIG. 5, the ferromagnetic flux guides 17, 18 protrude beyond the outer circumference of the cylindrical rotor body part 16. In this embodiment, the air gap distance of the synchronous reluctance motor is formed between the ends of the ferromagnetic flux guides 17, 18 and the stator.

Figure 6:
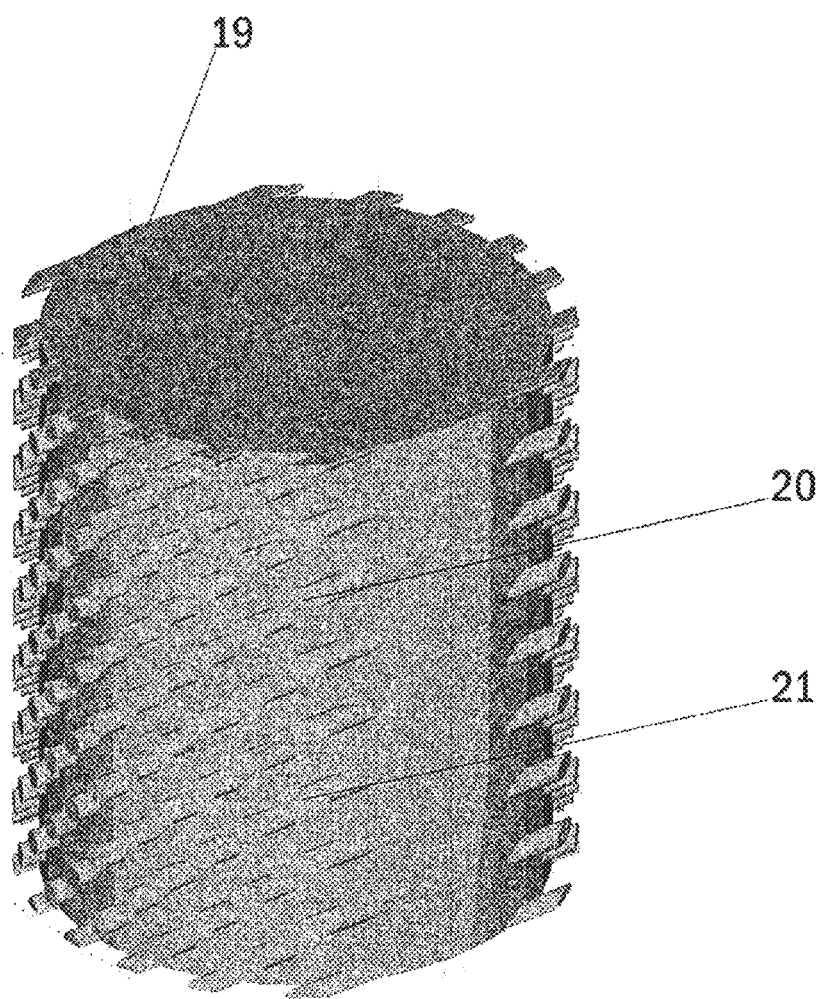
FIG. 6 shows a perspective view of a rotor of a synchronous reluctance motor according to an exemplary embodiment of the present disclosure.

FIG. 6 shows a perspective view of a rotor of a synchronous reluctance motor according to the embodiment as illustrated in FIG. 5. The rotor structure according to the present disclosure includes a cylindrical rotor body part 19 and ferromagnetic flux guides 20, 21. The cylindrical rotor body part 19 according to this embodiment includes ferromagnetic flux guides 20, 21, which can be made from ferromagnetic material and have been manufactured as inserts inside the cast. In the embodiment of FIG. 6 the ferromagnetic flux guides 20, 21 protrude beyond the outer circumference of the cylindrical rotor body part 19.

Figure 7:
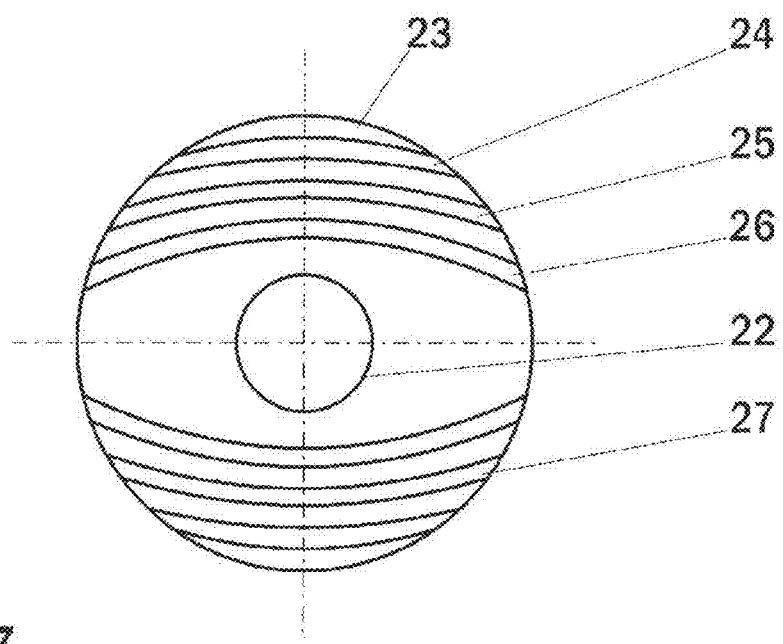
FIG. 7 shows a cross-sectional view of a rotor of a synchronous reluctance motor according to an exemplary embodiment of the present disclosure.

FIG. 7 shows a cross-sectional view of a rotor of a synchronous reluctance motor according to an exemplary embodiment of the present disclosure. In this embodiment of a rotor of a synchronous reluctance motor according to the present disclosure, the rotor core is formed from two different materials. In this embodiment, the rotor includes an inner cylindrical part 22 and an outer cylindrical part 23 formed around the inner cylindrical part 22. The inner cylindrical rotor part 22 can function as a rotor shaft. As the rotor is mounted to the synchronous reluctance motor frame where the rotor is centrally supported inside the stator of the synchronous reluctance motor the outer cylindrical rotor part 23 will align within an air gap distance from the stator. The inner cylindrical rotor part 22 can be made of magnetic metal material, e.g. ferromagnetic material, or alternatively made of non-magnetic metal material, e.g. superparamagnetic material.

In the exemplary embodiment of a rotor of a synchronous reluctance motor as illustrated in FIG. 7, the rotor structure includes cylindrical rotor body part 22, 23 and ferromagnetic flux guides 24-27 essentially in the direction of the direct axis (d-axis) of the reluctance motor. In this embodiment, the ferromagnetic flux guides 24-27 can be manufactured as curved so that the curved ferromagnetic flux guides 24-27 go through from one side of the outer circumference of the outer cylindrical rotor part 23 to the other side of the outer circumference of the outer cylindrical rotor part 23 while circumventing the inner cylindrical rotor part 22. In the embodiment of FIG. 7, the ferromagnetic flux guides 24-27 ends at the outer circumference of the outer cylindrical rotor part 23.

Figure 8:
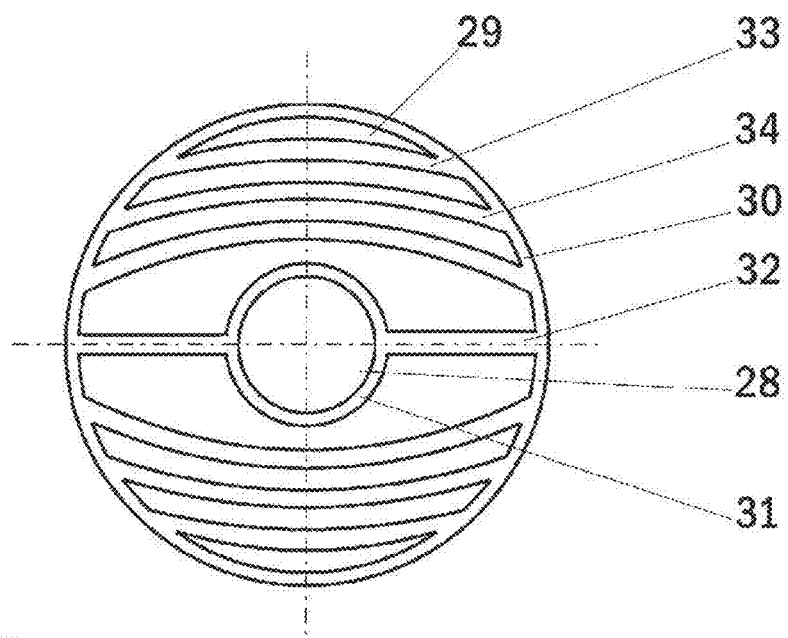
FIG. 8 shows a cross-sectional view of a rotor of a synchronous reluctance motor according to an exemplary embodiment of the present disclosure.

FIG. 8 shows a cross-sectional view of an exemplary embodiment of a rotor of a synchronous reluctance motor according to the present disclosure. In this embodiment of a rotor of a synchronous reluctance motor according to the present disclosure, the rotor core is formed from two different materials. In this embodiment, the rotor includes an inner cylindrical part 28 and an outer cylindrical part 29 formed around the inner cylindrical part 28. The inner cylindrical rotor part 28 can function as a rotor shaft. The inner cylindrical rotor part 28 can be made of magnetic metal material, e.g. ferromagnetic material, or alternatively made of non-magnetic metal material, e.g. superparamagnetic material.

In the exemplary embodiment of a rotor of a synchronous reluctance motor as illustrated in FIG. 8, the rotor is manufactured by first manufacturing a uniform ferromagnetic piece 30-34, for example, punching or cutting from a ferromagnetic plate. The uniform ferromagnetic pieces 30-34 can be stacked up to form the magnetically conducting parts of the rotor. The uniform ferromagnetic piece 30-34 according to this embodiment includes a narrow outer circumferential part 30, which holds the rotor structure together and ferromagnetic flux guides 33, 34 essentially in the direction of the direct axis (d-axis) of the reluctance motor. The uniform ferromagnetic piece 30-34 according to the embodiment of FIG. 8 can also include a narrow inner circumferential part 31, which is connected to the narrow outer circumferential part 30 with narrow strips 32.

In the embodiment of a rotor of a synchronous reluctance motor as illustrated in FIG. 8, the rotor is manufactured by stacking up uniform ferromagnetic pieces 30-34 to form the magnetically conducting parts of the rotor. The stacked ferromagnetic pieces 30-34 are placed into the cast mould of the rotor body part 29. The inner cylindrical rotor part 28 can also be placed into the cast mould of the rotor body part 29. Thereafter, the rotor body part 29 is casted from a superparamagnetic material. After casting of the rotor body part 29 the narrow outer circumferential part 30 of the ferromagnetic piece is removed at the entire length of the rotor allowing the ferromagnetic flux guides 33, 34 to reach the an outer circumference of the cylindrical part 29 of the rotor structure. As the rotor is mounted to the synchronous reluctance motor frame where the rotor is centrally supported inside the stator of the synchronous reluctance motor the outer cylindrical rotor part 29 will align within an air gap distance from the stator.

The rotor structure according to the present disclosure has been cast from a superparamagnetic material and includes ferromagnetic flux guides made from ferromagnetic material which ferromagnetic flux guides have been manufactured as inserts inside the cast. The ferromagnetic part of the rotor conducts the magnetic flux while the superparamagnetic material acts as a matrix to keep the rotor structure together and also shields the ferromagnetic elements from eddy current losses. The superparamagnetic rotor structure helps also to improve the power factor of the synchronous reluctance motor. The solution according to the present disclosure also prevents the harmonic flux from penetrating deep into the rotor. The superparamagnetic material is very suitable rotor material as it in itself does not produce any hysteresis losses.

With the help of the solution according to the present disclosure the manufacturers of synchronous reluctance motors will be able to considerably improve the manufacturing process and provide savings in comparison to the current prior art solutions. The solution according to the present disclosure can be utilised in any kind of synchronous reluctance motors.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for manufacturing a rotor of a synchronous reluctance motor with ferromagnetic flux guides, the method comprising:
   manufacturing a cylindrical rotor body part by casting from a superparamagnetic material.

2. A method according to claim 1, comprising:
   supporting ferromagnetic flux guides with special support structures connected to a cast mould of a cylindrical rotor body part; and
   manufacturing the cylindrical rotor body part by casting from a superparamagnetic material, so that the ferromagnetic flux guides go through from one side of the outer circumference of the cylindrical rotor part to the other side of the outer circumference of the cylindrical rotor part in the direction of a direct axis of the synchronous reluctance motor.

3. A method according to claim 2, comprising:
   after casting, fixing rotor shaft parts to both ends of the rotor body part.

4. A method according to claim 2, comprising:
   before casting, placing an inner cylindrical rotor shaft part into the cast mould of the rotor body part.

5. A method according to claim 1, comprising:
   drilling holes to the cylindrical rotor body part so that the holes go through from one side of the outer circumference of the cylindrical rotor part to the other side of the outer circumference of the cylindrical rotor part in the direction of a direct axis of the synchronous reluctance motor; and
   inserting supporting ferromagnetic flux guides to the holes.

6. A method according to claim 5, comprising:
   after casting, fixing rotor shaft parts to both ends of the rotor body part.

7. A method according to claim 5, comprising:
   before casting, placing an inner cylindrical rotor shaft part into a cast mould of the rotor body part.

8. A method according to claim 1, comprising:
   assembling magnetically conducting parts of the rotor by manufacturing uniform ferromagnetic pieces from ferromagnetic plate and stacking the ferromagnetic pieces up to form, the uniform ferromagnetic pieces comprising a narrow outer circumferential part and ferromagnetic flux guides essentially in the direction of the direct axis of the reluctance motor;
   manufacturing the cylindrical rotor body part by casting from a superparamagnetic material, so that the ferromagnetic flux guides go through from one side of the outer circumference of the cylindrical rotor part to the other side of the outer circumference of the cylindrical rotor part; and removing the narrow outer circumferential part of the ferromagnetic piece at the entire length of the rotor to allow the ferromagnetic flux guides to reach the outer circumference of the cylindrical part of the rotor structure.

9. A method according to claim 8, comprising:
before casting, placing an inner cylindrical rotor shaft part into a cast mould of the rotor body part, the rotor shaft part being supported by narrow inner circumferential parts of the ferromagnetic pieces, the narrow inner circumferential parts being connected to the narrow outer circumferential part of the ferromagnetic pieces with narrow strips.

10. A rotor of a synchronous reluctance motor, the rotor comprising:
a cylindrical rotor body part casted from a superparamagnetic material; and
ferromagnetic flux guides arranged inside the casted cylindrical rotor body part, and going through from one side of the outer circumference of the cylindrical rotor part to the other side of the outer circumference of the cylindrical rotor part in the direction of a direct axis of the synchronous reluctance motor.

11. A rotor according to claim 10, wherein the ferromagnetic flux guides are straight.

12. A rotor according to claim 10, wherein the ferromagnetic flux guides are curved.

13. A rotor according to claim 10, wherein the ferromagnetic flux guides are placed within a distance of 0.5 to 1.5 times the ferromagnetic flux guide diameter apart from one another in the direction of a shaft of the rotor and in the direction of a radius of the rotor.

14. A rotor according to claim 10, wherein the cross-section of the ferromagnetic flux guides is one of round, hexagon, rectangle, parallelogram and ellipse.

15. A rotor according to claim 10, wherein the ferromagnetic flux guides are manufactured from one of steel, iron, electric plate, steel wire and braided wire.

16. A rotor according to claim 10, wherein the ferromagnetic flux guides end at the outer circumference of the cylindrical rotor part.

17. A rotor according to claim 10, wherein the ferromagnetic flux guides protrude beyond the outer circumference of the cylindrical rotor part.

18. A rotor according to claim 10, wherein rotor shaft parts are fixed to both ends of the cylindrical rotor body part.

19. A rotor according to claim 10, wherein the cylindrical rotor body part is casted around an inner cylindrical rotor shaft part.

20. A synchronous reluctance motor having a rotor according to claim 10.

* * * * *